(12) United States Patent
Speit et al.

(10) Patent No.: US 6,184,162 B1
(45) Date of Patent: Feb. 6, 2001

(54) GLASSES AND GLASS-CERAMICS WITH HIGH E-MODULI

(75) Inventors: Burkhard Speit, Mainz; Silke Wolff, Huekeswagen; Peter Brix, Mainz; Monika Gierke, Wiesbaden, all of (DE)

(73) Assignee: Schott Glas, Mainz (DE)

( * ) Notice: Under 35 U.S.C. 154(b), the term of this patent shall be extended for 0 days.

(21) Appl. No.: 09/376,929

(22) Filed: Aug. 18, 1999

(30) Foreign Application Priority Data

Aug. 24, 1998 (DE) ............................................... 198 38 198

(51) Int. Cl.⁷ .............................. C03C 10/02; C03C 3/068
(52) U.S. Cl. ......................... 501/10; 501/78; 428/694 ST
(58) Field of Search .................. 501/10, 78; 428/694 ST

(56) References Cited

U.S. PATENT DOCUMENTS

| | | |
|---|---|---|
| 3,804,646 | 4/1974 | Dumbaugh, Jr. . |
| 4,196,004 | * 4/1980 | Berretz ................................... 501/17 |
| 5,997,977 | * 12/1999 | Zou et al. ....................... 428/694 ST |

FOREIGN PATENT DOCUMENTS

| | | |
|---|---|---|
| 26 60 012 C2 | 12/1983 | (DE) . |
| 34 20 306 A1 | 1/1985 | (DE) . |
| 42 06 268 A1 | 11/1992 | (DE) . |
| 0 626 353 A1 | 11/1994 | (EP) . |
| 0 287 345 A1 | 10/1998 | (EP) . |
| 52-9012 | 1/1977 | (JP) . |
| 52-45612 | 4/1977 | (JP) . |
| 63-170247 | 7/1988 | (JP) . |
| 1-133956 | 5/1989 | (JP) . |
| 9-301732 | 11/1997 | (JP) . |
| WO 96/04651 | 2/1996 | (WO) . |

* cited by examiner

Primary Examiner—Karl Group
(74) Attorney, Agent, or Firm—Michael J. Striker

(57) ABSTRACT

High E-moduli glasses and glass-ceramics are disclosed based on the $SiO_2$—$B_2O_3$—RO—$R_2O$—$ZrO_2$—$TiO_2$—$Nb_2O_5$—$La_2O_3$ system. The chemically pre-stressable glasses are lithium-poor or lithium-free. The glass-ceramics contain from 2 to 9 percent by weight lithium and the predominant crystalline phase is lithium titanate. These glasses and glass-ceramics particularly have a high specific E-modulus.

19 Claims, No Drawings

GLASSES AND GLASS-CERAMICS WITH HIGH E-MODULI

BACKGROUND OF THE INVENTION

1. Field of the Invention

The present invention relates to glasses and glass-ceramics with high elasticity moduli and their uses.

2. Prior Art

Glass is used as a data carrier substrate for fixed disks instead of metal, such as aluminum or metal alloy, because of its planarity and its reduced surface roughness, among other reasons. It is possible to polish glass, which is a most uniform material, to provide a very smooth surface on a glass body. Also the speed and economy of the glass substrate production process are comparable to the speed and economy of the production process for aluminum substrates.

Substrate glass for fixed disks must withstand large chemical, thermal and mechanical loads. Thus during coating (for example by cathode sputtering) it experiences high temperatures with high cooling rates. In use as a fixed disk substrate high mechanical loads occur, e.g. additional stresses occur in operation at the currently used high rotation speeds of 3,500 to 10,000 U/min because centrifugal forces and clamping stresses of up to 100 N/m² occur at the rotation axis during manufacture. Thin glass, especially with a thickness of from 0.25 to 3.00 mm can only stand these stresses when it is pre-stressed. Since the increase of mechanical load resistance by thermal pre-stressing is possible at a minimum thickness of 3 mm, glasses must be chemical pre-stressed for the above-named application. They are significantly pre-stressable by ion exchange in a salt bath under the transformation temperature $T_g$, i.e. suitable ions, such as $K^+$ and/or $Na^+$ and/or $Ba^{2+}$, have been shown to be sufficient for exchange with $Na^+$ and/or $Li^+$ and/or $Ca^{2+}$ ions.

An additional essential property of glass suitable for use as a fixed disk substrate is its thermal expansion behavior, which must not vary too much from that of the coating material (e.g. coalloys with thermal expansion coefficients $\alpha_{20/300} \geq 12 \times 10^{-6}/K$) and above all not too much from that of the clamping material and spindle material of the drive mechanism (with $\alpha_{20/300} \geq 12 \times 10^{-6}/K$) in order to avoid stresses and strains.

Glass-ceramic is an interesting material for the above application above all because of its fracture or breakage resistance. However the crystallite size limits the surface residual roughness to a high value in currently used glass-ceramics.

The developments in the fixed disk market are directed toward data carriers with higher capacity and greater data transfer rates with the dimensions of the data carriers remaining the same or being reduced. Higher data transfer rates require a higher rotation speed for the fixed disk in the drive mechanism. The capacity can only be increased while maintaining the dimensions the same by a higher track density or by an increase in the number on the fixed disk in the drive mechanism. However an increase in the rotation speed causes a strong flutter or pulsation of the fixed disk outer edges, which again makes the desired higher track density, also a reduced track spacing and also a narrow stacking of the fixed disks, impossible. Because of this flutter motion also the flight height or glide height of the read-write head over the fixed disk cannot be reduced, as is desired for an increasing the read/write speed and the information density.

The fixed disk thus requires a high shape stability, i.e. it should have a time dependent disk flutter that is as small as possible at its outer edges. The maximum disk flutter W is given by the following formula I:

$$W = \{[\rho \times r_A^4]/[E \times d^2]\} f(v) \qquad \text{I,}$$

wherein $\rho$=density $r_A$=outer diameter of the fixed plate

E=elasticity modulus d=thickness of the fixed plate f(v)=geometry-specific parameters.

The chief specifications or requirements for fixed disks can be derived from this formula. When the geometry remains the same (i.e. d, $r_A$, constant) the maximum flutter W is reduced when the elasticity modulus E is higher and/or the density $\rho$ is less. Usually the quotient of these parameters E/$\rho$ is designated the specific elasticity modulus. It should take the highest possible value.

The glasses and glass-ceramics known for this application are chiefly high $SiO_2$-containing alumino-silicate glasses or lithium aluminum silicate glass-ceramics, which have poor fusion properties because of their high $SiO_2$ content and high $Al_2O_3$ content. The chemically improved glass composition for substrates for information recording disclosed in DE 42 06 268 A1 having a content of from 62 to 75 percent by weight $SiO_2$ should be mentioned. Also the glass-ceramic for magnetic disk substrates disclosed in EP 626 353 A1 having a $SiO_2$ content of from 65 to 83% by weight, which contains $\alpha$-quartz and lithium silicate, should be mentioned in this connection.

The known glasses and glass-ceramics and other materials do not fulfill all the requirements for a material for a fixed disk, especially a fixed disk with a high rotation speed at the same time, but have a very wide variety of disadvantages.

Glasses for use as a substrate for plasma display panels are described in JP 9-301732 A. These glasses have a high $SiO_2$ content and high $Al_2O_3$ content and also a high content of alkali oxides, which leads to a reduced E-modulus.

JP 52-45612 A describes glasses with a high content of $Nb_2O_5$, which similarly leads to a reduced E-modulus. Also the glasses of DE 34 20 306 C2 contain a high $Nb_2O_3$ content.

Similarly the same is true for the glasses disclosed in JP 52-9012 A, which can contain a high content of $Nb_2O_5$, while the content of $TiO_2$ which increases the E-modulus must remain limited to a low level. The same is also true for the glasses of DE 26 60 012 C2, in which the content of the facultative component $La_2O_3$ additionally remains limited to a small percentage, which also is contrary to obtaining a high E-modulus.

EP 0 287 345 A1 describes glasses for lenses with a refraction gradient, which have a comparatively high $SiO_2$ and $Li_2O$ content. Because of the existing facultative and other components the glasses of course can have comparatively high E-moduli, but no suitably high specific E-moduli. This is also true for the high Li-content glasses of JP 63-170 247A for the same application. The glasses are very susceptible to crystallization because of the high Li-content. JP 1-133956 similarly describes glasses for lenses with a refraction gradient, whose composition can vary with many facultative components over a wide range, and which however necessarily contain up to 20 Mol % $F^-$ and a comparatively high $Al_2O_3$ content.

High $Al_2O_3$ glasses comprising the $MgO$—$Al_2O_3$—$SiO_2$ system which have high E-moduli are known from U.S. Pat.

No. 3,804,646. These glasses are however not chemically pre-stressable because they are free of alkali and also because they crystallize easily.

A data carrier consisting of a laminated disk of glass and a viscoelastic material is disclosed in WO 96/04651, in which oscillations are damped by the layer of viscoelastic material, for example plastic material, such as synthetic rubber, e.g. silicone rubber, or polyester, polyurethane and/or polyamide. However the manufacture of this material is very expensive and it is also disadvantageous that the viscoelastic material shows fatigue with time (becomes brittle) and then can no longer function to dampen the oscillations. Furthermore the plastic materials used can out-gas when the magnetic layer is precipitated at higher substrate temperatures by cathode sputtering and because of that impairs the quality of the applied layer.

SUMMARY OF THE INVENTION

It is an object of the present invention to provide a material, which has a high specific elasticity modulus, i.e. a high E-modulus and a reduced density, and a comparatively high thermal expansion coefficient, which has a sufficient rigidity or is hardenable so that it has a sufficient strength and has good surface properties.

According to the invention one material that attains the above-described object is a glass with a high E-modulus that has a composition (in weight percent based on oxide content) of

| | |
|---|---|
| $SiO_2$ | 17 to 34 |
| $B_2O_3$ | 1 to 8 |
| $Al_2O_3$ | 0 to 8 |
| $Li_2O$ | 0 to <2 |
| $Na_2O$ | 0.5 to 10 |
| MgO | 10 to 20 |
| CaO | 4 to 12 |
| $TiO_2$ | 14.5 to 25 |
| $ZrO_2$ | 1 to 8 |
| $Nb_2O_5$ | 0.5 to 4.5 |
| $La_2O_3$ | 5.5 to 15 |
| $Ce_2O_3$ | 0 to 8 | and at least one refining agent, as needed, in an amount suitable for its purpose, namely refining,
with the proviso that the sum of $La_2O_3+Ce_2O_3$ content present is less than or equal to 16 percent by weight based on oxide content.

According to the invention another material that attains the above-described object is a glass-ceramic with a high E-modulus comprising a base glass that has a composition (in weight percent based on oxide content) of

| | |
|---|---|
| $SiO_2$ | 17 to 34 |
| $B_2O_3$ | 1 to 8 |
| $Al_2O_3$ | 0 to 8 |
| $Li_2O$ | 2 to 10 |
| $Na_2O$ | 0.5 to 10 |
| MgO | 10 to 20 |
| CaO | 4 to 12 |
| $TiO_2$ | 14.5 to 25 |
| $ZrO_2$ | 1 to 8 |
| $Nb_2O_5$ | 0.5 to 4.5 |
| $La_2O_3$ | 5.5 to 15 |
| $Ce_2O_3$ | 0 to 8, | and at least one refining agent, as needed, in an amount suitable for its purpose, namely refining,
with the proviso that the sum of $La_2O_3+Ce_2O_3$ content present is less than or equal to 16 percent by weight based on oxide content.

and refining agents, as needed, in an amount suitable for their purpose.

Glass according to the invention can be used to make a pre-stressed substrate glass for fixed disks or as optical glass. The glass-ceramic according to the invention can be used for making a fixed disk substrate.

The glasses according to the invention can be sufficiently pre-stressed chemically by ion exchange of alkali and/or alkaline earth ions under the transformation temperature. This type of ion exchange can occur in a known way by placing a glass body in a melt (salt bath) of rather low melting potassium, sodium and/or barium salts, e.g. their nitrates, or also by application of pastes of rather higher melting potassium, sodium and/or barium salts, e.g. their sulfates, on the surface of the glass body. Acting times and temperatures correspond to those conditions used conventionally according to the glass composition in this sort of ion exchange process, i.e. times between 0.5 h and 10 h and temperatures between $T_g$ (transformation temperature)–80 K and $T_g$–10 K. The lower temperatures required higher dwell times. The chemical pre-stressing provides a strong and permanent pre-stressing so that the fracture or breakage resistance of the glasses increases.

The glass-ceramics according to the invention already have a sufficient strength, so that they can withstand the conditions to which the fixed disks are exposed. This is due to the strengthening of the glass matrix by the crystallites.

The glass according to the invention is part of the alkaline earth borosilicate glass system. It contains $SiO_2$ as glass former and for course from 17 to 34% by weight, preferably up to 32% by weight $SiO_2$, and $B_2O_3$ (1 to 8% by weight).

A very good fusibility with an already high E-modulus is guaranteed by the weight relationship of the glass former to the alkaline earth oxides, namely 10 to 20% by weight MgO and 4 to 12 percent by weight CaO.

A higher proportion of $SiO_2$ and $B_2O_3$ in relation to MgO and CaO would lower the thermal expansion coefficients. A higher proportion of $SiO_2$ would lower the fusibility of the glass, while an increase of the proportion of alkaline earth oxides of course would lead to a further increase in the E-modulus, but would greatly impair the crystallization stability.

The glass can contain up to 8 percent by weight $Al_2O_3$. The mobility of the alkali and alkaline earth ions in the glass structure is improved by introducing $Al_2O_3$ and their exchangability is thus improved. More than 8 percent by weight of $Al_2O_3$ increases the processing temperature, which leads to an impairment of the fusion conditions and a lowering of the thermal expansion coefficient.

$TiO_2$ is present in the glass at a minimum amount of 14.5% by weight and a maximum amount of 25% by weight. It increases the E-modulus of the glass. A further increase in the amount of $TiO_2$ present would strongly lower the crystallization stability. The glass contains $ZrO_2$ in an amount of from 1 to 8 percent by weight, which similarly raises the E-modulus, but does not have the same negative effect on the crystallization. At higher amounts however the transformation temperature $T_g$ rises, which again produces an impairment of the melting properties. Thus the glass contains both $TiO_2$ and $ZrO_2$ in the named amounts.

The glass also contains $La_2O_3$ in amounts between 5.5 and 15.5% by weight. $La_2O_3$ increases the E-modulus, but also the density of the glass so that the positive effect in regard to the specific E-modulus is smaller.

The increase of the density is not so pronounced with $Ce_2O_3$. On account of this the glass can contain up to 8 percent by weight, preferably up to 5 percent by weight, of this very expensive ingredient, $Ce_2O_3$, which similarly increases the E-modulus. In a special embodiment the glasses, preferably the lithium-containing glasses, contain at least 0.5 percent by weight $Ce_2O_3$. The sum of the $La_2O_3$ and $Ce_2O_3$ content should not exceed 16 percent by weight, 14 percent by weight when $Ce_2O_3$ is limited to 5 percent by weight.

$Nb_2O_3$ is present in amounts from 0.5 to 4.5 percent by weight. In small amounts it would act as a network-modifying agent opposing crystallization stability. In larger amounts the E-modulus would be greatly reduced and would raise the batch price.

$Na_2O$, present in an amount of from 0.5 to 10 percent by weight, fulfills two functions in the glass: First, it improves the fusability and lowers $T_g$ and for another, especially in the lithium-free embodiments, besides CaO it is essential for ion-exchange for the pre-stressing, since potassium salts displace sodium ions from the glass, while barium salts displace calcium ions during ion exchange.

The glass can also contain small amounts (0 to <2 percent by weight) of $Li_2O$. Then the Li ions are removed during the ion exchange process and can be used for performing the exchange process in addition to the sodium salt melts or pastes containing the above-named salts.

Higher concentrations of $Li_2O$ do not necessarily make the material unsuitable for making fixed disk substrates. The higher $Li_2O$ content in the glass leads to crystallization after melting and hot forming, which can be performed in a controlled manner to form the glass-ceramic according to the invention.

The glass-ceramic with a high E-modulus comprises a base glass that has a composition (in weight percent based on oxide content) of $SiO_2$, 17 to 34 (preferably 17 to 32); $B_2O_3$, 1 to 8; $Al_2O_3$, 0 to 8 (preferably 0 to 5); $Li_2O$, 2 to 10 (preferably 3 to 10); $Na_2O$, 0.5 to 10; MgO, 10 to 20; CaO, 4 to 12; $TiO_2$, 14.5 to 25; $ZrO_2$, 1 to 8; $Nb_2O_5$, 0.5 to 4.5; $La_2O_3$, 5.5 to 15, $Ce_2O_3$, 0 to 8 (preferably from 0.5 to 5) and with $La_2O_3+Ce_2O_3 \leq 16$ (preferably $\leq 14$).

The action of the ingredients in the glass-ceramic according to the invention is the same as described above in the glass according to the invention. When present in the higher amounts $Li_2O$ is the initiator of a crystallization, which forms a crystalline phase—the predominant crystalline phase is lithium titanate—which is so highly homogeneous and fine grained that the material can be similarly processed like the glass according to the invention. The resulting glass-ceramic has a smooth surface similar to that of the glass according to the invention. At a content of $Li_2O$ that is higher than 10 percent by weight the crystallization would be uncontrolled and would occur too fast.

In order to "brake" an uncontrolled crystallization, which leads to an inhomogeneously distributed, non-uniform sized crystals, the ingredient $Nb_2O_5$ named as a crystallization stabilizer in the case of the glass according to the invention also is a crystallization stabilizer in the case of the glass-ceramic. The same concentrations of $Nb_2O_5$ are maintained in the glass-ceramic as in the glass according to the invention. That is also true for the ingredients CaO and MgO, $TiO_2$ and $Na_2O$.

Both the glass and also the glass-ceramic can contain from 0.2 to 7.5 percent by weight of one or more color-imparting agent, selected from the group consisting of CoO, CuO, $V_2O_5$, and $Cr_2O_3$. The amount of each of these color-imparting agents should not exceed 5 percent by weight individually. In case CuO, $V_2O_5$ and $Cr_2O_3$ are present, they are each present in amount of at least 0.5% by weight.

For refining conventional refining agents, such as $As_2O_3$, $Sb_2O_3$ and NaCl, can be added to the glass or the base glass for the glass-ceramic in the conventional amounts, i.e. according to the type of refining agents used and the total amount of product in amounts of from 0.05 to 1 percent by weight of product.

Preferably the refining agent $As_2O_3$ should be avoided, i.e. the unavoidable impurities in the glass and glass-ceramic materials should be free of arsenic oxide, since the materials according to the invention should be as free as possible of environmentally unfriendly ingredients.

In a preferred embodiment the glass or glass-ceramic contains 0.1 to 0.5 percent by weight $Sb_2O_3$.

Preferably the glasses according to the invention are $Li_2O$-free. The following composition ranges (in percent by weight based on oxide) with narrower preferred ranges are for the glass according to the invention:

$SiO_2$, 20 to 30 (preferably 24 to 30); $B_2O_3$, 2 to 7; $Al_2O_3$, 1 to 5 (preferably 2 to 5); $Na_2O$, 0.5 to 10 (preferably 0.5 to 8); MgO, 10 to 20 (especially preferably 10 to 18); CaO, 4 to 10; $TiO_2$, 15 to 25 (especially preferably 16 to 25); $ZrO_2$, 3 to 7 (especially preferably 4 to 6); $Nb_2O_5$, 0.5 to 4 (especially preferably 0.5 to 3.5); $La_2O_3$, 6 to 12 (especially preferably 6.5 to 9.5); $Ce_2O_3$, 0 to 3.5 (especially preferably from 0 to 1.5) and with $La_2O_3+Ce_2O_3 \leq 13$ (especially preferably 8 to 10).

The preferred glass-ceramic is characterized by the following base glass composition (in weight percent based on oxides):

$SiO_2$, 20 to 30 (preferably 24 to 30); $B_2O_3$, 2 to 7(preferably 2 to 5); $Al_2O_3$, 0 to 3 (especially preferably 0 to 2); $Li_2O$, 3 to 9; $Na_2O$, 1 to 8 (preferably 1 to 5.5); MgO, 10 to 18 (especially preferably 10 to 16); CaO, 6 to 10(preferably 7 to 10); $TiO_2$, 15 to 25 (especially preferably 16 to 25); $ZrO_2$, 3 to 7 (especially preferably 4 to 6); $Nb_2O_5$, 0.5 to 4 (especially preferably 0.5 to 3.5); $La_2O_3$, 6 to 12 (especially preferably 6.5 to 9.5); $Ce_2O_3$, 0 to 3.5 (especially preferably from 0 to 1.5) and with $La_2O_3+Ce_2O_3 \geq 13$ (especially preferably 8 to 10). The particularly preferred minimum amount of $Ce_2O_3$ is 0.5% by weight.

Crystallization occurs after hot forming during cooling because of the weight relationship of the crystallization inhibiting ingredients to the crystallization promoting ingredients, especially because of the $Li_2O$ and $TiO_2$ content, which cause formation of nuclei. The ceramicizing occurs in a controlled manner with a cooling rate of 25 to 45 K/h, especially of 30 to 40 K/h, starting from a $T_K=T_g+10$ K. Lithium titanate arises as the predominant crystal phase. A tempering process is not necessary. The crystallites arising are small and are very uniform in size and uniformly distributed. According to the phase relationships (relationship of the crystalline to the glass phases) and the size of the crystallites the glass-ceramic is transparent, translucent or opaque. However these latter light transmission properties are not critical or decisive for the fixed disk substrate application. The fixed disk substrate from opaque material or material of reduced transmittance due to a coloring agent present in it has the advantage that it has a reduced permeability for testing light of a surface quality testing unit, which should detect imperfections at the surface and not in the bulk material.

Independently of the transmission the material is such that the surface of a glass-ceramic body made from it may be easily processed and may be polished to the desired smoothness, with a maximum roughness of 0.5 nm, as is also is possible for glass bodies made from the glass according to the invention.

EXAMPLES

Eight examples of glasses according to the invention (examples 1 to 3) and glass-ceramics (examples 4 to 8) according to the invention are given in Table I. Table_I contains their compositions and their essential properties.

The conventional raw materials are used for manufacture. The product is melted at about 1300° C. in a continuous melt aggregate, refined and homogenized. The glass is poured at a casting temperature of about 1200° C. and cooled.

During this cooling process at about 30 to 40 K/h, starting from a temperature $T_g+10K=T_k$, the ceramicizing ends with a glass-ceramic. Round disks were made from the resulting cast block (glass or glass-ceramic body), which have the form and dimensions of fixed disk substrates, i.e. an outer diameter of 65.0 mm and a thickness of 0.635 mm and a concentric interior hole with a diameter of 20.00 mm.

The thermal expansion coefficient $\alpha_{20/300}$ of the glasses and the glass-ceramics is greater than or equal to $8.0\times10^{-6}$/K and less than or equal to $11.0\times10^{-6}$/K and is thus sufficiently close to that of the spindle material, which supports the fixed disk on the disk drive mechanism. Table I also contains important properties for the fixed disk application including elasticity modulus E [$10^3$ N/mm$^2$], density $\rho$ [g/cm$^3$] and specific elasticity modulus E/$\rho$ [$10^5$ N×cm/g], calculated therefrom, as well as transformation temperature $T_g$[° C.] and thermal expansion coefficient $\alpha_{20/300}$. The E-modulus is determined in unstressed sample. The glasses have elasticity moduli between $100\times10^3$ and $120\times10^3$ N/mm$^2$ and specific elasticity moduli E/$\rho$ of from $30\times10^5$ to $36\times10^5$ N cm/g. The glass-ceramics have elasticity moduli between $120\times10^3$ and $145\times10^3$ N/mm$^2$ and specific elasticity moduli E/$\rho$ of from $36\times10^5$ to $45\times10^5$ N cm/g. Both groups are outstandingly suitable for use as fixed disk substrates. The glasses are chemically pre-stressed and form a sufficiently deep compression region. The glass-ceramics already have a sufficiently high strength.

The glass-ceramics contain lithium titanate as the predominant crystalline phase. The bodies are transparent, translucent or opaque in accordance with the phase relationships (relationships of the crystalline phase to the glass phase) and the size of the crystallites. Their appearance is recorded in Table I. The number and size of the crystals varies according to the Li and Ti contents, and also the Nb content, i.e. it increases with increasing Li$_2$O and increases with increasing TiO$_2$ content, but decreases with increasing Nb$_2$O$_5$ content, which is crystallization inhibiting. The glass-ceramic is opaque with increasing Mg content. The crystal sizes are less and are between 100 nm and 400 nm, primarily between 100 and 200 nm.

Because of the uniform distribution of the fine grained crystallites in the glass-ceramic according to the invention the surfaces of the bodies from this material are similarly satisfactorily processed, including the surfaces of the glass bodies of the composition according to the invention. They are satisfactorily polished and indeed they can be worked to a micro-roughness (smoothness) of 0.5 nm.

The glasses according to the invention have an index of refraction $n_d$ between 1.72 and 1.77 and an Abbé number $v_d$ between 32 and 36 and thus belong to the Lanthanflint optical glass type (LaF). They have their partial dispersion $P_{g,F}$ in the blue part of the spectrum as well as the anomaly of their partial dispersion $\Delta P_{g,F}$ [$10^{-4}$] like glasses with positive anomalous partial dispersion. The glasses according to the invention are outstanding as optical glasses because of these optical properties and because of their good melting and processing properties.

TABLE I

COMPOSITIONS (IN WEIGHT % ON AN OXIDE BASIS) AND ESSENTIAL PROPERTIES (1 to 3, GLASSES, 4 to 8 GLASS-CERAMICS): Part I. Compositions

|  | 1 | 2 | 3 | 4 | 5 | 6 | 7 | 8 |
|---|---|---|---|---|---|---|---|---|
| SiO$_2$ | 27.4 | 27.4 | 27.4 | 27.4 | 27.4 | 27.4 | 27.4 | 27.4 |
| B$_2$O$_3$ | 4.0 | 4.0 | 4.0 | 4.0 | 4.0 | 4.0 | 4.0 | 4.0 |
| Al$_2$O$_3$ | — | 1.0 | 1.0 | — | — | 0.5 | — | — |
| Li$_2$O | — | — | — | 3.9 | 6.4 | 5.9 | 6.4 | 6.4 |
| Na$_2$O | 7.5 | 5.9 | 6.5 | 3.6 | 1.1 | 0.6 | 1.1 | 1.1 |
| MgO | 16.0 | 20.0 | 16.0 | 17.0 | 20.0 | 16.0 | 12.0 | 10.0 |
| CaO | 8.9 | 8.9 | 8.9 | 8.9 | 8.9 | 8.9 | 8.9 | 8.9 |
| TiO$_2$ | 19.0 | 16.0 | 19.0 | 19.0 | 16.0 | 19.0 | 22.0 | 24.0 |
| ZrO$_2$ | 5.2 | 5.2 | 5.2 | 5.2 | 5.2 | 5.2 | 5.2 | 5.2 |
| Nb$_2$O$_5$ | 2.0 | 1.0 | 2.0 | 1.0 | 1.0 | 2.0 | 3.0 | 3.0 |
| La$_2$O$_3$ | 8.7 | 5.5 | 8.7 | 8.7 | 8.7 | 9.7 | 8.7 | 8.7 |
| Ce$_2$O$_3$ | 1.0 | 4.2 | 1.0 | 1.0 | 1.0 | — | 1.0 | 1.0 |
| CoO | — | 0.5 | — | — | — | 0.5 | — | — |
| Sb$_2$O$_3$ | 0.3 | 0.3 | 0.3 | 0.3 | 0.3 | 0.3 | 0.3 | 0.3 |

COMPOSITIONS (IN WEIGHT % ON AN OXIDE BASIS) AND ESSENTIAL PROPERTIES (1 to 3, GLASSES, 4 to 8 GLASS-CERAMICS): Part II. Properties

| | | | | | | | | |
|---|---|---|---|---|---|---|---|---|
| $T_g$, ° C. | 619 | 629 | 635 | 568 | 572 | 563 | 561 | 555 |
| $\alpha_{20/300}$* [#] | 9.5 | 9.4 | 9.2 | 10.2 | 10.6 | 10.6 | 10.5 | 10.4 |
| E* | 111 | 114 | 111 | 126 | 137 | 132 | 132 | 130 |
| $\rho$, g/cm$^3$ | 3.27 | 3.26 | 3.28 | 3.30 | 3.30 | 3.30 | 3.33 | 3.34 |
| E/$\rho$[#] | 33.9 | 35.0 | 33.8 | 38.2 | 41.5 | 40.0 | 39.7 | 38.9 |
| $n_d$ | 1.7543 | 1.7355 | 1.7556 | 1.7685 | — | — | — | — |
| $v_d$ | 33.03 | 35.54 | 33.01 | 33.48 | — | — | — | — |

TABLE I-continued

| | | | | | | | | |
|---|---|---|---|---|---|---|---|---|
| $P_{g,F}$ | .5918 | 0.5858 | 0.5919 | 0.5909 | — | — | — | — |
| $\Delta P_{g,F} 10^{-4}$ | 38 | 18 | 36 | 35 | — | — | — | — |
| Appearance | | | | Transparent | Opaque | Opaque | Translucent | Translucent |

*#Units of $\alpha$ in $10^{-6}$/K.
Units of E/$\rho$ in $10^5 \times$ N cm/g
*Units of E in $10^3 \times$ N/mm$^2$ The disclosure in German Patent Application 198 38 198.0-45 of Aug. 24, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a universal container for medicinal purposes, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The percentages by weight of ingredients in the glasses and glass-ceramics recited in the appended claims are to be understood as percentages by weight on an oxide basis.

What is claimed is new and is set forth in the following appended claims:

We claim:

1. A high E-modulus glass comprising

| | |
|---|---|
| $SiO_2$ | 17 to 34% by weight, |
| $B_2O_3$ | 1 to 8% by weight, |
| $Al_2O_3$ | 0 to 8% by weight, |
| $Li_2O$ | 0 to <2% by weight, |
| $Na_2O$ | 0.5 to 10% by weight, |
| MgO | 10 to 20% by weight, |
| CaO | 4 to 12% by weight, |
| $TiO_2$ | 14.5 to 25% by weight, |
| $ZrO_2$ | 1 to 8% by weight, |
| $Nb_2O_5$ | 0.5 to 4.5% by weight, |
| $La_2O_3$ | 5.5 to 15% by weight, |
| $Ce_2O_3$ | 0 to 8% by weight, | and at least one refining agent, as needed, in an amount suitable for refining, with the proviso that ≦16% by weight of a sum of said $La_2O_3$ and said $Ce_2O_3$ is present.

2. The glass as defined in claim 1, further comprising from 0.2 to 7.5 percent by weight of at least one color-imparting substance selected from the group consisting of CoO, CuO, $V_2O_5$ and $Cr_2O_5$, and wherein each of said at least one color-imparting substance is present in an amount not exceeding 5% by weight.

3. The glass as defined in claim 1, further comprising from 0.1 to 0.5% by weight of $Sb_2O_3$ acting as said at least one refining agent.

4. The glass as defined in claim 1, containing no arsenic oxide.

5. The glass as defined in claim 1, containing from 20 to 30% by weight of said $SiO_2$, from 2 to 7 percent by weight of said $B_2O_3$, from 1 to 5 percent by weight of said $Al_2O_3$, from 0.5 to 10 percent by weight of said $Na_2O$, from 10 to 20 percent by weight of said MgO, from 4 to 10 percent by weight of said CaO, from 15 to 25 percent by weight of said $TiO_2$, from 3 to 7 percent by weight of said $ZrO_2$, from 0.5 to 4 percent by weight of said $Nb_2O_5$, from 6 to 12 percent by weight of said $La_2O_3$ and from 0 to 3.5 percent by weight of said $Ce_2O_3$; and with the proviso that ≦13% by weight of a sum of said $La_2O_3$ and said $Ce_2O_3$ is present.

6. The glass as defined in claim 1, containing from 24 to 30% by weight of said $SiO_2$, from 2 to 7 percent by weight of said $B_2O_3$, from 2 to 5 percent by weight of said $Al_2O_3$, from 0.5 to 8 percent by weight of said $Na_2O$, from 10 to 18 percent by weight of said MgO, from 4 to 10 percent by weight of said CaO, from 16 to 25 percent by weight of said $TiO_2$, from 4 to 6 percent by weight of said $ZrO_2$, from 0.5 to 3.5 percent by weight of said $Nb_2O_5$, from 6.5 to 9.5 percent by weight of said $La_2O_3$ and from 0 to 1.5 percent by weight of said $Ce_2O_3$; and with the proviso that from 8 to 10% by weight of a sum of said $La_2O_3$ and said $Ce_2O_3$ is present.

7. A chemically pre-stressed glass made by chemically pre-stressing a high E-modulus glass, said high E-modulus glass comprising

| | |
|---|---|
| $SiO_2$ | 17 to 34% by weight, |
| $B_2O_3$ | 1 to 8% by weight, |
| $Al_2O_3$ | 0 to 8% by weight, |
| $Li_2O$ | 0 to <2% by weight, |
| $Na_2O$ | 0.5 to 10% by weight, |
| MgO | 10 to 20% by weight, |
| CaO | 4 to 12% by weight, |
| $TiO_2$ | 14.5 to 25% by weight, |
| $ZrO_2$ | 1 to 8% by weight, |
| $Nb_2O_5$ | 0.5 to 4.5% by weight, |
| $La_2O_3$ | 5.5 to 15% by weight, |
| $Ce_2O_3$ | 0 to 8% by weight, | and at least one refining agent, as needed, in an amount suitable for refining, with the proviso that ≦16% by weight of a sum of said $La_2O_3$ and said $Ce_2O_3$ is present, and said chemically pre-stressed glass having an elasticity modulus E between $100 \times 10^3$ N/mm$^2$ and $120 \times 10^3$ N/mm$^2$, a specific elasticity modulus E/$\rho$ of from $30 \times 10^5$ N cm/g to $36 \times 10^5$ N cm/g and a thermal expansion coefficient $\alpha_{20/300}$ between $8.0 \times 10^{-6}$/K and $11.0 \times 10^{-6}$/K.

8. A high E-modulus glass-ceramic made from a base glass comprising

| | |
|---|---|
| $SiO_2$ | 17 to 34% by weight, |
| $B_2O_3$ | 1 to 8% by weight, |
| $Al_2O_3$ | 0 to 8% by weight, |
| $Li_2O$ | 2 to 10% by weight, |
| $Na_2O$ | 0.5 to 10% by weight, |
| MgO | 10 to 20% by weight, |

-continued

| | |
|---|---|
| CaO | 4 to 12% by weight, |
| TiO$_2$ | 14.5 to 25% by weight, |
| ZrO$_2$ | 1 to 8% by weight, |
| Nb$_2$O$_5$ | 0.5 to 4.5% by weight, |
| La$_2$O$_3$ | 5.5 to 15% by weight, |
| Ce$_2$O$_3$ | 0 to 8% by weight, | and at least one refining agent, as needed, in an amount suitable for refining, with the proviso that ≦16% by weight of a sum of said La$_2$O$_3$ and said Ce$_2$O$_3$ is present.

9. The glass-ceramic as defined in claim 8, wherein said base glass contains from 20 to 30 percent by weight of said SiO$_2$, from 2 to 7 percent by weight of said B$_2$O$_3$, from 0 to 3 percent by weight of said Al$_2$O$_3$, from 3 to 9 percent by weight of said Li$_2$O, from 1 to 8 percent by weight of said Na$_2$O, from 10 to 18 percent by weight of said MgO, from 6 to 10 percent by weight of said CaO, from 15 to 25 percent by weight of said TiO$_2$, from 3 to 7 percent by weight of said ZrO$_2$, from 0.5 to 4 percent by weight of said Nb$_2$O$_5$, from 6 to 12 percent by weight of said La$_2$O$_3$ and from 0 to 3.5 percent by weight of said Ce$_2$O$_3$, and with the proviso that ≦13% by weight of a sum of said La$_2$O$_3$ and said Ce$_2$O$_3$ is present.

10. The glass-ceramic as defined in claim 8, wherein said base glass contains from 24 to 30 percent by weight of said SiO$_2$, from 2 to 5 percent by weight of said B$_2$O$_3$, from 0 to 2 percent by weight of said Al$_2$O$_3$, from 3 to 9 percent by weight of said Li$_2$O, from 1 to 5.5 percent by weight of said Na$_2$O, from 10 to 16 percent by weight of said MgO, from 7 to 10 percent by weight of said CaO, from 16 to 25 percent by weight of said TiO$_2$, from 4 to 6 percent by weight of said ZrO$_2$, from 0.5 to 3.5 percent by weight of said Nb$_2$O$_5$, from 6.5 to 9 percent by weight of said La$_2$O$_3$ and from 0 to 1.5 percent by weight of said Ce$_2$O$_3$, and with the proviso that from 8 to 10% by weight of a sum of said La$_2$O$_3$ and said Ce$_2$O$_3$ is present.

11. The glass-ceramic as defined in claim 8, further comprising from 0.2 to 7.5 percent by weight of at least one color-imparting substance selected from the group consisting of CoO, CuO, V$_2$O$_5$ and Cr$_2$O$_5$, and wherein each of said at least one color-imparting substance is present in an amount not to exceed 5% by weight.

12. The glass-ceramic as defined in claim 8, further comprising from 0.1 to 0.5% by weight of Sb$_2$O$_3$ acting as said at least one refining agent.

13. The glass-ceramic as defined in claim 8, containing no arsenic oxide.

14. The glass-ceramic as defined in claim 8, made by a method comprising the steps of hot forming the base glass, cooling the base glass after the hot forming and ceramicizing said base glass during the cooling after the hot forming.

15. The glass-ceramic as defined in claim 14, wherein the cooling takes place at a cooling rate of from 25 to 45 K/h, starting from $T_k=T_g+10K$.

16. The glass-ceramic as defined in claim 8, having an elasticity modulus E between 120×10$^3$ N/mm$^2$ and 145×10$^3$ N/mm$^2$, a specific elasticity modulus E/ρ of from 36×10$^5$ N cm/g to 45×10$^5$ N cm/g and a thermal expansion coefficient $\alpha_{20/300}$ between 8.0×10$^{-6}$/K and 11.0×10$^{-6}$/K.

17. A pre-stressed glass substrate for fixed disks, said substrate comprising said high E-modulus glass as defined in claim 1.

18. An optical glass comprising said high E-modulus glass as defined in claim 1.

19. A pre-stressed glass substrate for fixed disks, said substrate comprising said high E-modulus glass-ceramic as defined in claim 8.

* * * * *